Patented Jan. 22, 1952

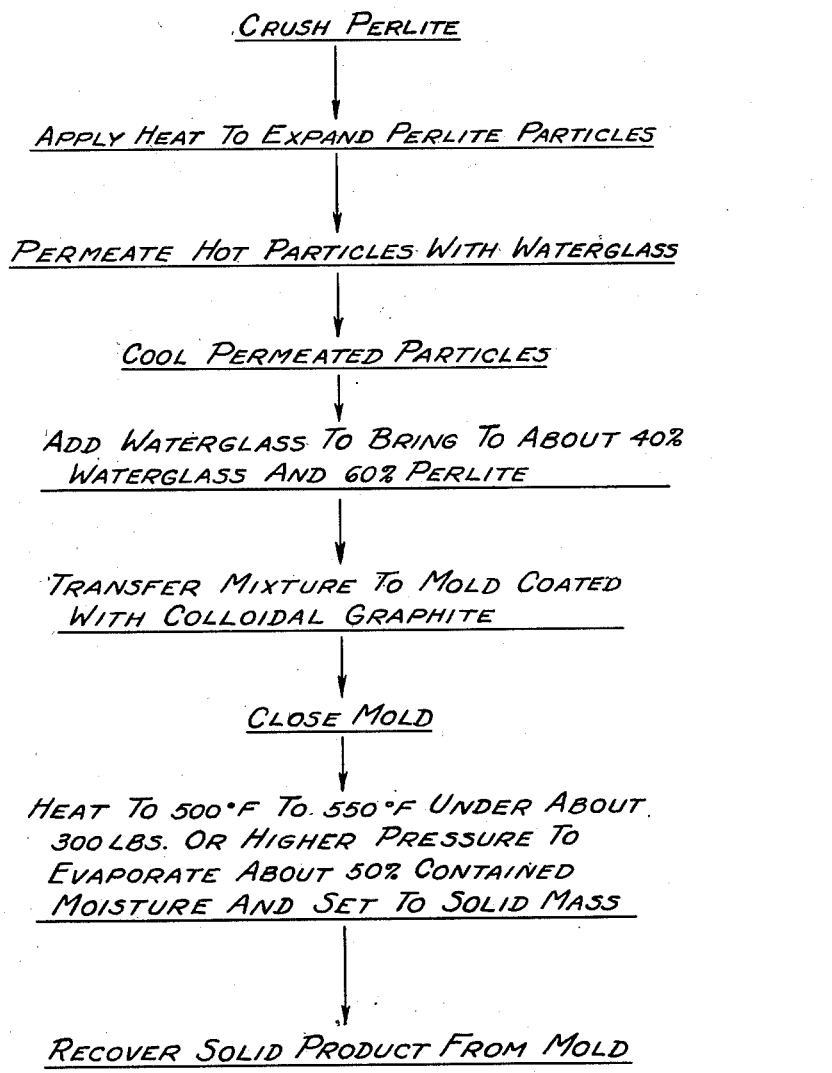

2,583,292

UNITED STATES PATENT OFFICE 2,583,292

BUILDING MATERIAL AND PROCESS OF MAKING SAME

Oliver G. Bowen and Edward W. Novell, Pasadena, Calif.; said Novell assignor to said Bowen Application February 24, 1948, Serial No. 10,575

22 Claims. (Cl. 18—47.5)

Our invention relates to a new composition of matter suitable for use in fabricating building and insulating blocks, boards, roof decking and sheets, and also to a method of manufacturing such construction and insulating materials.

Many composition materials are used extensively in the construction of buildings, some of these materials being comparatively light in weight and possessing thermal insulating, water-repelling, fire-resisting, and other desirable properties. It has been determined, however, that some materials which have one or more of the above characteristics are expensive to produce, and therefore, their use is prohibitive. Moreover, it appears that none of the existing materials possess all of the desirable qualities, and thus, in order to obtain a material having some of the necessary characteristics, other properties must be sacrificed. For example, if a construction material is to be used for supporting considerable weight, it may be found that this substance has low thermal insulating qualities, that the weight of the material itself is prohibitive, or that such material is not fire resistant. In other words, it has heretofore been impossible to obtain a composition which will possess all the desirable properties and meet the several requirements.

One reason for the failure to produce a composition material which, in addition to being comparatively light in weight, and possessing water-repelling, fire-resisting, and thermal insulating properties, also possesses a high modulus of rupture and ultimate compressive strength, has been that no natural material was thought available for the purpose. While many minerals, such as vermiculite, were tried with varying degrees of success, each of these materials, even when specially treated and combined with different binding agents, were devoid of the strength necessary to support loads in building structures. This was due, of course, to the fact that the basic metallic material was in itself of a strengthless nature.

It is a primary object of our invention to provide a new composition of matter which is especially suitable for construction purposes and one which is light in weight, has a relatively high modulus of rupture, relatively high compressive strength, is fire resistant, has low thermal conductivity, and is proof against vermin and insects.

Another object is to provide a substance capable of being molded or otherwise fabricated to form building blocks, boards, roof decking, or sheets to adapt it for a large variety of uses.

Another object is to provide a composition comprising a mineral, such as siliceous volcanic glass and a suitable binding agent, such as sodium silicate and calcium borate.

Another object is to provide a method of molding a substance of the character specified to produce building and insulating blocks, boards, or roof decking of different shapes and sizes adapted for various uses.

Another object is to provide a composition building element in which reinforcing members, such as steel, may be embedded to produce a construction element which has a high modulus of rupture and compressive strength, the strength of the reinforcing members being added to the strength of the molded substance.

Further objects of our invention will appear from the following specification, which describes the improved construction material as composed of preferred substances and fabricated in a particular manner by way of example.

Our improved composition of matter comprises, in general, an expanded siliceous volcanic glass, the particles of which are bonded together by binding agents such as sodium silicate and calcium borate.

We have found that any of the mineraloid group (such as obsidian, perlite, pitch stone, palagonite, etc.) having the property of expansion to glass fragments upon the application of relatively high temperatures, have good insulating properties and could be adapted to the producing of any of the described compositions with no change necessary in process or binders. Of this group, we have found that the expanded siliceous volcanic glass, known as perlite, provides an excellent insulating material which is comparable with ground cork with respect to insulating properties. Perlite is a siliceous volcanic glass containing two to five per cent of plus water and differs from other volcanic glasses, such as obsidian and pitch stone, by the water content.

The steps of the process are indicated in the accompanying flow sheet.

The perlite is first crushed and sized, and the particles are then placed in a kiln and subjected to temperatures preferably ranging from 1600° F. to 1850° F. As the particles are thus heated, they will pop or expand rapidly into light-weight cellular glass fragments having a specific gravity ranging from .08 to .35 against an original specific gravity of 2.4 in their initial compact state. The particles or granules of this expanded material may be used in a loose state as insulating material and may readily be poured into insulating compartments. The thermal conductivity of this material is extremely low, and thus it may be used as an insulating agent in refrigerators, stoves, and the like. Because the particles of this material are physically weak, due to their lightness caused by their great range of expansion, such loose material has only a limited range of use.

We have determined through experimentation that when such particles of expanded perlite are held together by a suitable binding agent, a homogeneous mass may be formed possessing relatively great strength, the degree of strength being dependent upon the particular type of binder employed. A preferred method of binding the expanded particles of perlite together to form a mass of suitable shape and size will be explained hereinafter.

We have found that water glass (sodium silicate solution) is especially suited as a binding agent for expanded perlite. Calcium borate may advantageously be added to the dry perlite particles. The ratio of sodium oxide to silica can be varied in the manufacture of water glass, since each is soluble in water, thus permitting a wide range of flexibility either to the alkaline or to the silica side but it has been determined that a 40° Baumé water glass is most suitable. The adhesiveness of water glass is developed by the partial loss of moisture.

With respect to the proportions of water glass and expanded perlite to be used, tests have indicated that a ratio of approximately 60% perlite to approximately 40% binders by weight, when treated under suitable conditions of heat and pressure, produce a solid mass having a modulus of rupture of at least 400 pounds per square inch and a compressive strength of at least 800 to 1,000 pounds per square inch, which may be molded during manufacture to any desired shape. For example, it may be molded to form flat sheets or blocks which are admirably suited for use as a building material. Additional resistance to the bending moment can be secured to whatever strength is desired by the insertion of steel reinforcement near the surface of the top and bottom faces of the material.

In addition to providing a new composition of matter and articles made therefrom the present invention also provides a method of manufacturing such articles. Assuming that it is desired to produce light-weight building blocks or bricks using perlite as the basic material, the perlite is first crushed to small particles. The crushing of the perlite may be accomplished in conventional equipment. After being crushed, the loose particles of perlite are inserted into a kiln and subjected to relatively high temperature, preferably ranging from 1600° F. to 1850° F. As the perlite particles are thus heated, they spontaneously expand or explode to many times their original size, thus forming light-colored cellular fragments resembling hollow spheroids. After such expansion of the perlite, its specific gravity will range from approximately .08 to .35, and thus the resulting material is extremely light in weight. The density of the resutling expanded perlite may be controlled by varying the temperature used in expanding the same, and the temperature employed also is a function of the initial size of the perlite particles. As previously explained, the resulting expanded perlite has a low thermal conductivity and, in addition, possesses low expansion and contraction qualities.

As will be explained hereinafter, the exfoliated perlite is molded into a homogeneous mass of required size and shape by a preferred method in accordance with the invention and to successfully perform the molding operation it is essential that the perlite be in as dry condition as possible in order to permit the binding agent to permeate the individual perlite particles and provide an effective binder therebetween. In this respect, we have discovered a new, and unexpected factor, which is extremely vital to the successful molding of the homogeneous mass. As is well known, exfoliated perlite readily absorbs moisture from the atmosphere. It was previously thought that by reheating the perlite, immediately prior to its combining with the binding agent, a sufficient amount of this absorbed moisture could be driven off. Through extensive experimentation, however, we have determined that no amount of reheating, regardless of the duration of application of the heat, will drive off even a substantial part of this absorbed moisture. Consequently, if the exfoliated perlite contains any substantial amount of moisture at the time it is molded, it is impossible to extract the moisture by any known process and, as a result, a relatively weak bond will be effected and the molded construction element is apt to crumble or disintegrate when subjected to appreciable loads. To avoid such a condition, we have conceived a method of treating the exfoliated perlite in a manner which will insure against the presence of excessive moisture therein at the time of molding. In accordance with our improved method, we propose to mold the article while the perlite is in the relatively dry condition it assumes immediately following its exfoliation in the kiln. In order to avoid the absorption of any atmospheric moisture into the exfoliated perlite, it would, of course, be necessary to insert the perlite into the mold while it is in a hot, dry condition and before it has an opportunity to absorb any atmospheric moisture. By so utilizing the perlite, and end product, which is approximately double the strength of previous products made under the adverse condition mentioned above, is obtained. As it is impractical to conduct the molding operation immediately following calcining, and as storage of the perltie is usually required before molding, we have developed a process of preserving the perlite in its relatively dry condition until needed in the molding operation. This is accomplished by spraying the hot exfoliated perlite as it is taken from the kiln with a relatively small amount of the same binding agent which is to form a constituent of the end product. It is found that if the binder is applied in the proportion of 5 per cent to 10 per cent of binder to 90 per cent to 95 per cent of the perlite, calculated on a weight basis, a satisfactory protective coating is produced. Due to the hygroscopic character of the perlite, the binder is drawn into, and permeates, each particle of the perlite, leaving a relatively dry material which can be adequately handled on conveyors or the like and stored for substantial periods of time without sticking, and without absorbing moisture. As a step in the molding process, additional quantities of the binder are mixed with the perlite and the composition subjected to heat and pressure to obtain a homogeneous mass of the desired size and shape.

In accordance with a preferred practice, we employ as the binder what is termed a 40° Baumé water glass containing approximately 1 part $Na_2O$ to 3.22 parts $SiO_2$ and about 62.4%

H₂O. As pointed out above, a small quantity of calcium borate may be added to the dry perlite particles in a dry mix and while the addition thereof is not essential in the present invention, it is very desirable as it tends to stabilize the siliceous content of the water glass. The loose expanded perlite is next combined or mixed with a binding agent such as water glass, preferably in the ratio of approximately 60% perlite to approximately 40% binding agent. Since the water glass contains approximately 60% water, the composition is thus composed of approximately 60% perlite, 15% sodium silicate, and 25% water. Expressed on a water-free basis, the product contains four parts of perlite with one part of sodium silicate (water glass), or, in other words, 80% perlite and 20% water glass.

While the mixture of perlite and binding agent may be formed into a homogeneous mass by any suitable means, we have found that the mass can be molded conveniently to desired shape and size. We therefore provide a mold of appropriate shape, into which the mixture is placed to be compressed.

We have found that water glass tends to adhere tenaciously to metallic surfaces, and this is especially true when the substance is subjected to heat and pressure in a mold. Considerable difficulty has been experienced in removing the product from the mold due to this tendency to adhere, since the article commonly breaks, cracks, and chips when attempts are made to eject it from the mold. To overcome this difficulty, we prefer to apply a suitable lubricant to surfaces of the mold to prevent adherence of the binder thereto, and we have found that a product sold under the trade name "Aquadag" is best suited for this purpose. Aquadag is a colloidal graphite highly concentrated in distilled water and contains about 22 per cent solids by weight. This concentrated product is preferably diluted to twenty times its own weight before application to the surfaces of a mold. Before applying the Aquadag, the surfaces of the mold must be cleaned thoroughly to remove grease or other foreign matter, and this may be accomplished by the application of steam or a solvent such as trichlorethylene. The Aquadag may be sprayed, brushed, or swabbed onto the cleaned surfaces of the mold cavity, or the mold may be dipped into the solution. In any case, the mold preferably should be preheated to a temperature in excess of 250° F. to cause rapid evaporation of the water contained in the solution, thus hastening the drying of the minute particles of graphite and effecting a tenacious bond of the particles to the metallic surfaces.

With the surfaces of the mold cavity thus coated with colloidal graphite, the mold is ready for operation, and a quantity of the perlite-water glass and calcium borate mixture is inserted therein and thereafter subjected to whatever pressure necessary, depending upon the material being molded, and sufficient heat applied to vaporize a portion of the water in the water glass, thus allowing the adhesive property of the binder to develop. The pressure and heat are maintained for a period depending upon the size and shape of the product being made. After the building block or other article has been molded to the desired form and density, it may readily be removed from the mold due to the lubricating qualities of the graphite with which the mold walls were originally coated. The mold may be used again to produce other perlite articles, but before each molding operation the mold preferably should be preheated to above 250° F., since the water content of the water glass might otherwise be absorbed by the graphtie coating, thus tending to destroy the lubricating film. Preheating of the mold has the added advantage of storing heat which is available in the subsequent molding operation to reduce the time of the molding cycle. It has been found that with the exercise of proper care and during continuous use of the mold, the film of graphite will remain effective for a period of at least eight hours of operation, following which the mold ordinarily should be recoated.

As will be understood by those skilled in the art, the factors of time, temperature, and pressure used in the molding operation are interrelated. By conducting various tests we have concluded that a very satisfactory end product is assured by subjecting the composition to a molding pressure of 300 pounds per square inch and a temperature of 500° F. to 550° F. The time of applying the heat and pressure may be expressed, in minutes as equal to 15 times thickness, in inches, to the 2.3 power. The period of heating is found to be very critical inasmuch as if heating is not continued for at least the minimum time as expressed by the foregoing formula, upon cooling, internal steam will fracture the material causing it to flake off, and be worthless and upon any substantial overheating the material quite rapidly loses strength. It is, therefore, very important to conduct the heating for about the time indicated by the formula. This results in the expulsion of approximately 50% or more of the water content.

The molded block produced by the above method consists of a homogeneous mass in which the particles of expanded perlite are tenaciously bonded together by the water glass binder. As will be understood, the sodium silicate in the water glass binder is chemically compatible with the perlite. This resulting product is exceptionally strong and durable, and it has been determined that this product has a modulus of rupture of at least 400 pounds per square inch with a material of specific gravity of .7 and a thickness of one inch, such material having a compressive strength of at least 800 to 1,000 pounds per square inch.

It is within the concept of our invention to provide a building material constructed mainly from the composition disclosed above but embodying reinforcing elements, such as steel rods, and standard structural sections which are embedded in the material during the molding operation. In producing such reinforced building material, the reinforcing steel is first coated with water glass, which provides an excellent bond between the steel and the surrounding material. As is apparent, during molding the steel expands substantially, and then on cooling must contract. This puts the steel under a very substantial initial stress, which may be as high as 50,000 pounds per square inch and this, of course, adds to the strength of the reinforced slab. As far as we are aware, the present structural material is entirely new in the art since apparently no one has used heretofore a reinforcing material having a high modulus of elasticity in a covering material of this type having a very low modulus of elasticity. As will be apparent, this results in the strength of the reinforcing material being added to the strength of the molded product and this is in contradistinction to conventional building materials such as reinforced concrete where the opposite is true. In the present composite material, the reinforcing steel will frequently break before the molded material breaks, whereas with reinforced concrete, the concrete will always break before the reinforcing material.

It will be observed from the foregoing that our invention provides a new and useful composition of matter suitable for use in making construction blocks, wallboards, roof decking, and other articles. The improved building material is especially light in weight and yet strong and durable in use. Moreover, the improved material is resistant to fire, besides being proof against vermin and insects. The material may be used to great advantage as side walls, partitions and roofs in buildings and as linings in refrigerators and heating equipment. Because the material does not expand or contract to any appreciable degree, it will not be subject to cracking due to sudden temperature changes. In addition, the improved material has a relatively high modulus of rupture and compressive strength and it thus may be used not only as a covering or insulation, but also as a structural supporting member. This constitutes an important improvement over previous compositions of matter utilized for making building materials wherein basic volcanic substances and micaceous substances having no inherent strength are employed, it being apparent that the use of such prior compositions is necessarily limited to wall sections, insulating panels, and the like, which are not intended to support loads. The improved material has the appearance of concrete or plaster and may readily be painted, coated, damp-proofed, or water-proofed by any reputable product for this purpose. Furthermore, the ingredients forming the new composition are relatively inexpensive and the product may be manufactured at a low cost. Thus, the finished product may be sold at a price usually paid for inferior materials not possessing the desirable properties of our improved material.

Steel or other metal reinforcing rods or members may readily be embedded in the perlite and binding agent mixture prior to the molding operation, so as to mold sheet material, as described, having one or more metallic reinforcing members therein. Slabs molded in this way form strong structural members, due to the fact that our product has a low modulus of elasticity and does not crack readily. Consequently, the inherent strength of the material is added to the strength of the reinforcing members, and smaller reinforcing members may be employed than is possible with a conventional material, such as concrete. The formation of such a reinforced product is a further object of the invention.

Our invention further provides a method of manufacturing the improved building and insulating material. The method or process includes a minimum number of simple steps which may be carried out through the use of standard equipment, and thus the need for special apparatus is avoided, and the over-all cost of manufacture is reduced to a minimum. It is to be noted that the process includes the important step of conditioning the mold so that the product may readily be removed from the mold without damage.

While the new composition of matter has been described as comprising preferred ingredients combined in specific proportions, and the method of manufacturing articles from the composition of matter has been explained as comprising a series of preferred steps, it is to be understood that various changes may be made in the composition and in the method of manufacturing articles from the composition without departing from the spirit of the invention, and we therefore reserve the right to all such changes as properly come within the scope of the appended claims.

We claim as our invention:

1. A method of forming a composition of matter, including the steps of: mixing hot, dehydrated expanded perlite particles and sealing and binding water glass to form a mixture thereof and coat and seal said particles; and subjecting said mixture to a temperature of from 500° F. to 550° F. to evaporate a portion of the moisture from said mixture to cause said water glass to bind said particles together into a solid mass.

2. A method of forming a composition of matter, including the steps of: mixing hot, dehydrated expanded perlite particles and water glass to form a mixture thereof to coat and seal said particles and prevent absorption of atmospheric moisture thereby, said water glass having a ratio of $Na_2O$ to $SiO_2$ approximating 1:3.22; and subjecting said mixture to a temperature of from 500° F. to 550° F. and to a pressure of approximately at least 300 pounds per square inch to evaporate a portion of the moisture from said mixture to cause said water glass to bind said particles together into a solid mass.

3. A method of forming a composition of matter, including the steps of: mixing hot, dehydrated expanded perlite particles and water glass to form a mixture thereof to coat and seal said particles and prevent absorption of atmospheric moisture thereby, said water glass having a ratio of $Na_2O$ to $SiO_2$ approximating 1:3.22; and subjecting said mixture to a temperature of from 500° F. to 550° F. for a period, in minutes, equal to not less than fifteen times the thickness, in inches, of the mass to be produced to the 2.3 power to evaporate a substantial portion of the moisture from said mixture to cause said water glass to bind said particles together into a solid mass.

4. A method of forming a composition of matter, including the steps of: mixing hot, dehydrated expanded perlite particles and water glass to form a mixture thereof to coat and seal said particles and prevent absorption of atmospheric moisture thereby, said water glass having a ratio of $Na_2O$ to $SiO_2$ approximating 1:3.22; and subjecting said mixture to a temperature of from 500° F. to 550° F. and to a pressure of approximately at least 300 pounds per square inch for a period, in minutes, equal to not less than fifteen times the thickness, in inches, of the mass to be produced to the 2.3 power to evaporate a substantial portion of the moisture from said mixture to cause said water glass to bind said particles together into a solid mass.

5. A method of producing articles composed of exploded perlite particles and sealing and binding water glass in a mold, consisting in: dehydrating said particles; mixing said dehydrated particles and said water glass in the ratio of approximately 60% perlite particles to 40% water glass by weight to provide a composition; applying colloidal graphite to the cavity of said mold to lubricate its surfaces; preheating said mold to a temperature in excess of 250° F.; placing said composition in said cavity; closing said mold and applying heat of from 500° F. to 550° F. and pressure of approximately 300 pounds per square inch for a period, in minutes, equal to fifteen times the thickness, in inches, of the mass to be produced to the 2.3 power to eliminate approximately 50% of the water content from said water glass and to bind said particles and the sodium silicate of said water glass together to provide a homogeneous mass; and removing said mass from said mold.

6. A method of forming a composition of matter, including the steps of: heating perlite particles to expand said particles and expel moisture therefrom and dehydrate the same; applying aqueous, liquid water glass to said particles while said particles are still hot and relatively dry to cause said water glass to permeate and protect each particle to prevent the absorption of atmospheric moisture thereby, said water glass having a ratio of $Na_2O$ to $SiO_2$ approximating 1:3.22 and initially containing in the order of 60% of water; mixing said permeated particles, when cool, with additional said water glass so that the composition will then have approximately four parts perlite particles and one part sodium silicate by weight; and evaporating some of the moisture from said mixture to cause said water glass to bind said particles into a solid mass.

7. A method of forming a composition of matter, including the steps of: subjecting perlite particles to relatively high temperature to expand said particles and expel moisture therefrom and dehydrate the same; applying a sufficient amount of water glass to said particles while said particles are still hot and dehydrated to cause said water glass to permeate, coat and protect each particle to prevent the absorption of atmospheric moisture thereby, said water glass having a ratio of sodium oxide to silicon oxide approximating 1:3.22 and containing approximately 60% water; mixing said permeated particles, when cool, with additional said water glass so that the composition will then have approximately 60% perlite particles and 40% water glass by weight; and evaporating approximately 50% of the water content from said water glass to bind said particles and the sodium silicate of said water glass together to provide a homogeneous mass.

8. A method of preparing perlite for subsequent use in a composition of matter, including the steps of: crushing and sizing the perlite to reduce it to particles of selected size; subjecting said particles to relatively high temperature to expand said particles and dehydrate the same; and applying sealing and binding water glass to said particles while said particles are still hot and relatively dry to permeate, coat and protect each particle so as to prevent the absorption of atmospheric moisture thereby.

9. A method of treating perlite, including the steps of: crushing and sizing the perlite to reduce it to particles of selected size; subjecting said particles to relatively high temperature approximating 1600° F. to 1850° F. to expand said particles and expel moisture therefrom; and applying binding and sealing water glass to said particles while said particles are still hot and relatively dry to cause said water glass to permeate and protect each particle so as to prevent subsequent absorption of atmospheric moisture thereby.

10. A method as in claim 9 wherein the water glass coating and protecting the perlite particles has a ratio of $Na_2O$ to $SiO_2$ in the order of 1:3.22, said water glass being employed in proportion approximating 5% to 10% by weight of the particles.

11. A method of forming a composition of matter, including the steps of: heating perlite particles to expand said particles and expel moisture therefrom; applying water glass to said particles while said particles are still hot and relatively dry to cause said water glass to permeate and protect each particle to prevent the absorption of atmospheric moisture thereby, said water glass having a ratio of $Na_2O$ to $SiO_2$ approximating 1:3.22 and containing approximately 60% water; mixing said permeated particles, when cool, with additional said water glass so that the composition will then have approximately 60% perlite particles and 40% water glass by weight; and subjecting said mixture to a temperature of from 500° F. to 550° F. to evaporate moisture from said mixture to cause said water glass to set and bind said particles together into a solid mass.

12. A method of forming a composition of matter, including the steps of: heating perlite particles to expand said particles and expel moisture therefrom; applying sealing and binding water glass to said particles while said particles are still hot and relatively dry to cause said water glass to permeate and protect each particle to prevent the absorption of atmospheric moisture thereby; mixing said permeated particles, when cool, with additional water glass so that the composition will then have approximately 60% perlite particles and 40% water glass by weight; and subjecting said mixture to a temperature of from 500° F. to 550° F. and to a pressure of approximately not less than 300 pounds per square inch to evaporate moisture from said mixture to cause said water glass to bind said particles together into a solid mass.

13. A method of forming a composition of matter, including the steps of: heating perlite particles to expand said particles and expel moisture therefrom; applying water glass to said particles while said particles are still hot and relatively dry to cause said water glass to permeate and protect each particle to prevent the absorption of atmospheric moisture thereby; mixing said permeated particles, when cool, with additional water glass so that the composition will then have approximately 60% perlite particles and 40% water glass by weight; and subjecting said mixture to a temperature of from 500° F. to 550° F. and to a pressure of approximately at least 300 pounds per square inch for a period, in minutes, equal to not less than fifteen times the thickness, in inches, of the mass to be produced to the 2.3 power to evaporate moisture from said mixture to cause said water glass to set and bind said particles together into a solid mass, said water glass having a ratio of $Na_2O$ to $SiO_2$ approximating 1:3.22 and initially containing in the neighborhood of 60% of water.

14. A method of forming a composition of matter, including the steps of: heating perlite particles to expand said particles and expel moisture therefrom; applying liquid, aqueous water glass to said particles while said particles are still hot and relatively dry to cause said water glass to permeate and protect each particle to prevent the absorption of atmospheric moisture thereby, said water glass having a ratio of $Na_2O$ to $SiO_2$ approximating 1:3.22; mixing said permeated particles, when cool, with additional water glass so that the composition will then have approximately 60% perlite particles, 15% sodium silicate and 25% water by weight to provide a composition; placing said composition in a mold; closing said mold and applying heat of from 500° F. to 550° F. and pressure of approximately at least 300 pounds per square inch for a period, in minutes, equal to not less than fifteen times the thickness, in inches, of the mass to be produced to the 2.3 power to eliminate approximately 50% of the water content from said water glass and to bind said particles and the sodium silicate of said water glass together to provide a homogeneous mass; and removing said mass from said mold.

15. A method of forming a composition of matter, including the steps of: heating perlite particles to expand said particles and expel moisture therefrom; applying aqueous sealing and binding water glass to said particles while said particles are still hot and relatively dry to cause said water glass to permeate and protect each particle to prevent the absorption of atmospheric moisture thereby; mixing said permeated particles, when cool, with aqeous sealing and binding water glass so that the composition will then have approximately four parts perlite particles and one part sodium silicate by weight to provide a composition; applying colloidal graphite to the cavity of a mold to lubricate its surfaces; preheating said mold to a temperature in excess of 250° F.; placing said composition in said cavity; closing said mold and applying heat of from 500° F. to 550° F. and pressure of approximately at least 300 pounds per square inch for a period, in minutes, equal to not less than fifteen times the thickness, in inches, of the mass to be produced to the 2.3 power to eliminate approximately 50% of the water content from said water glass and to bind said particles and the sodium silicate of said water glass together to provide a homogeneous mass; and removing said mass from said mold.

16. A composition comprising exfoliated, dehydrated perlite particles coated and sealed with sealing and binding water glass maintaining the dehydrated condition of the particles.

17. A structural composition comprising exfoliated, dehydrated perlite particles sealed with a dried coating of water glass whose $Na_2O$ to $SiO_2$ ratio approximates 1:3.22, such coating maintaining the dehydrated character of the perlite particles.

18. A composition as in claim 17 wherein the water glass coating approximates 5% to 10% by weight of the composition.

19. A composition comprising exfoliated, dehydrated perlite particles encased in and sealed by water glass whose $Na_2O$ to $SiO_2$ ratio approximates 1:3.22, said water glass maintaining the dehydrated character of the perlite particles and serving also as a binding agent existing in proportion between about 5% and 40% of the composition.

20. A structural composition comprising exfoliated, dehydrated perlite particles encased in and sealed by set water glass whose $Na_2O$ to $SiO_2$ ratio approximates 1:3.22, said sealing water glass maintaining the dehydrated character of the perlite particles and being present in proportion by weight of between about 5% and about 20% of the composition.

21. A composition as in claim 20 wherein the set sealing and binding water glass constitutes approximately 20% of the composition.

22. A composition as in claim 20 having a modulus of rupture of at least 400 pounds per square inch with a thickness of one inch and a compressive strength of at least 800 pounds per square inch.

OLIVER G. BOWEN.
EDWARD W. NOVELL.

REFERENCES CITED

The following references are of record in the file of this patent:

UNITED STATES PATENTS

| Number | Name | Date |
|---|---|---|
| 1,682,675 | Horsfield | Aug. 28, 1928 |
| 1,693,015 | Babor et al. | Nov. 27, 1928 |
| 1,831,982 | Wagner | Nov. 17, 1931 |
| 2,209,163 | Kaloustian | July 23, 1940 |
| 2,209,170 | Nevin | July 23, 1940 |
| 2,246,463 | Garratt | June 17, 1941 |
| 2,328,644 | Happe | Sept. 7, 1943 |
| 2,330,837 | Mullen | Oct. 5, 1943 |
| 2,388,060 | Hicks | Oct. 30, 1945 |
| 2,433,265 | Denning | Dec. 23, 1947 |
| 2,455,666 | Fournier | Dec. 7, 1948 |